Oct. 5, 1937. P. VANDENPUT 2,094,730
DRIVING DEVICE
Filed Nov. 28, 1936 2 Sheets-Sheet 2

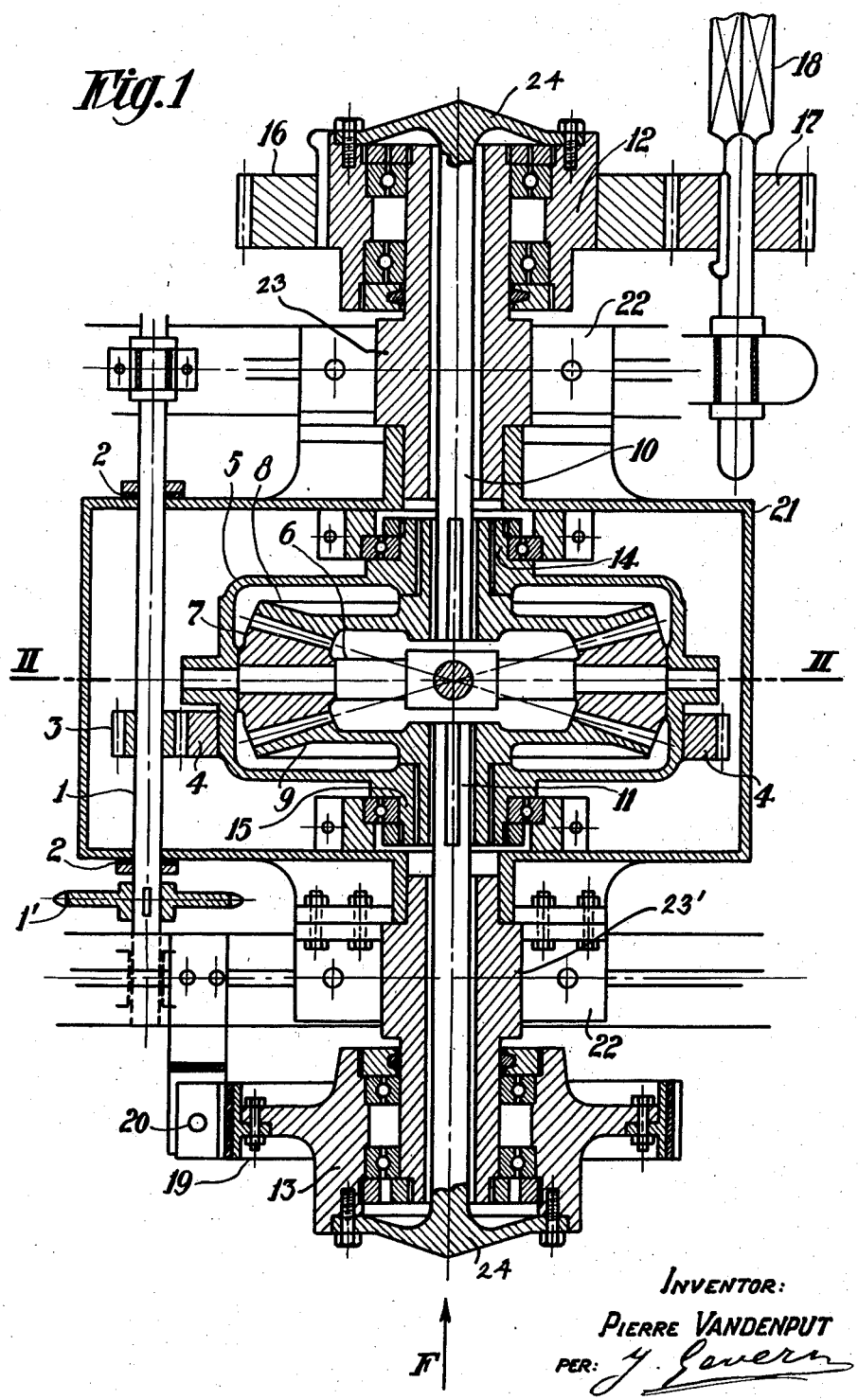

INVENTOR:
PIERRE VANDENPUT
PER: *J. Severs*
ATTORNEY

Patented Oct. 5, 1937

2,094,730

UNITED STATES PATENT OFFICE 2,094,730

DRIVING DEVICE

Pierre Vandenput, La Hulpe, Belgium

Application November 28, 1936, Serial No. 113,240
In Belgium November 30, 1935

1 Claim. (Cl. 74—288)

The present invention is an improved driving device for web winding rollers, such as are used for winding paper, cardboard, fabric, rubber, sheet metal, etc., in long lengths.

The object of the invention is to provide an improved driving device in which the tension of the web is held constant during the winding process.

For this purpose, it has been proposed to include in such driving means a differential gear and a brake mechanism operating on the casing thereof to vary the speed of the driven member of the gear and correspondingly vary the speed of the winding roller.

The invention will be described with reference to the accompanying drawings.

Fig. 1 is a longitudinal section of the differential transmission device.

Figure 3:
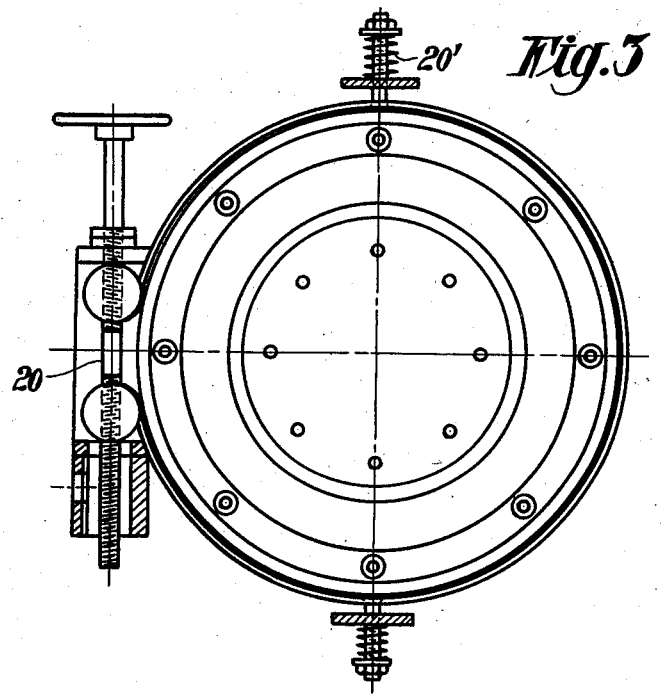
Fig. 3 is a side view according to the arrow F.
Figure 2:
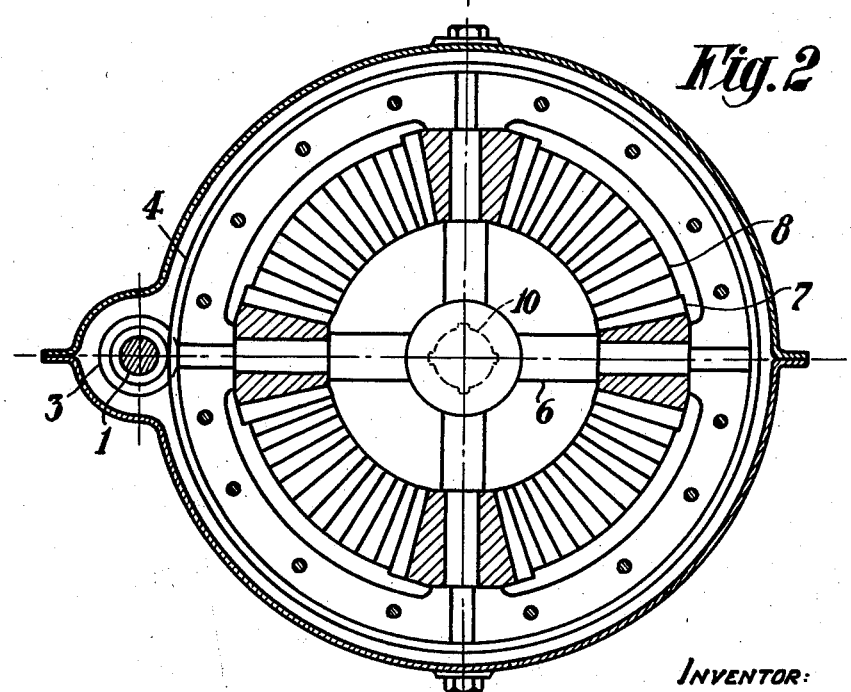
Fig. 2 is a section on line II—II of Fig. 1.

According to the invention, the differential transmission device comprises a shaft 1, to which a uniform angular speed is imparted by pulley, gear or motor 1'. This shaft rotates in ball bearings 2 and is provided with a fixed pinion 3 meshing with a crown wheel 4 driving the differential casing 5.

In the form illustrated, this casing 5 is provided with four bushes, in which is mounted a spider 6, in the central portion of the device. The four shaft ends of this spider are each provided with a bevel pinion 7, freely rotating thereon, said pinions being the planet wheels of the differential. These bevel pinions 7 mesh with the sun wheels 8 and 9 feathered at the ends of independent auxiliary shafts 10, 11. The differential casing 5 is rotatably mounted in ball bearings 14—15 within a housing 21 fixed to the machine frame by means of lugs 22 and intermediate two fixed tubular members 23, 23', in alinement with each other and parallel to the driving shaft 1. Upon the tubular member 23 is mounted a gear wheel 16 with interposition of a ball bearing 12. Upon the tubular member 23' is mounted a brake pulley 19 with interposition of a ball bearing 13. The shafts 10 and 11 pass through the tubular members 23—23' and are provided at their ends with cap-shaped enlargements or heads 24, which are rigidly connected by means of bolts to the gear wheel 16 and the brake pulley 19 respectively.

The gear wheel 16 meshes with a pinion 17 feathered upon the shaft of the winding roller 18.

Upon the rim of the brake pulley acts a brake band, which may be made of metal, leather, fabric or any other convenient material, with interposition of an appropriate friction surface. The action of this brake is adjustable by a screw 20 and return springs 20'.

When no cause disturbs the angular speed of the roller 18, the transmission elements, as well as the planet pinions and the driving wheels impart to the roller a circumferential speed slightly greater than that of the sheet-like material to be wound upon the roller, so that said material will be put under an initial tension, which, moreover, will remain constant during the formation of the roll of material, owing to the adjustable slipping action of the brake 19—20.

I claim:

In a driving device for a web winding roller comprising a driving shaft, gear wheels, a differential gear intermediate the driving shaft and the roller and an adjustable brake element adapted to control the speed transmitted to the winding roller, the arrangement of a differential casing, which is directly driven by the driving shaft and gear wheels, a housing fixed intermediate two fixed tubular members in alinement with each other and parallel to the driving shaft, the differential casing being rotatably mounted in said housing, one of said tubular members rotatably supporting a brake pulley surrounded by an adjustable brake band and the other tubular member rotatably supporting a gear wheel meshing with a spur-wheel on the winding roller shaft, the shafts of the differential sun wheels passing through said tubular members and having at their ends enlarged heads rigidly connected to the brake pulley and the gear wheel respectively for the purpose set forth.

P. VANDENPUT.